(12) United States Patent
Jiang et al.

(10) Patent No.: US 11,336,475 B2
(45) Date of Patent: May 17, 2022

(54) MULTICAST PACKET TRANSMISSION METHOD, APPARATUS, AND SYSTEM

(71) Applicant: Huawei Technologies Co., Ltd., Shenzhen (CN)

(72) Inventors: Yuanlong Jiang, Dongguan (CN); Chunrong Li, Dongguan (CN); Yongjian Hu, Dongguan (CN); Weiping Xu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/830,911

(22) Filed: Mar. 26, 2020

(65) Prior Publication Data
US 2020/0228361 A1    Jul. 16, 2020

Related U.S. Application Data

(63) Continuation of application No. PCT/CN2018/094950, filed on Jul. 9, 2018.

(30) Foreign Application Priority Data

Sep. 27, 2017  (CN) .......................... 201710891109.2

(51) Int. Cl.
*H04L 12/18*        (2006.01)
*H04L 41/0654*  (2022.01)

(52) U.S. Cl.
CPC ...... *H04L 12/1863* (2013.01); *H04L 41/0654* (2013.01)

(58) Field of Classification Search
None
See application file for complete search history.

(56) References Cited

U.S. PATENT DOCUMENTS

| | | | |
|---|---|---|---|
| 2003/0223749 A1* | 12/2003 | Funk ...................... | H04L 45/00 398/59 |
| 2004/0208575 A1* | 10/2004 | Kinoshita .......... | H04Q 11/0005 398/83 |
| 2006/0193328 A1* | 8/2006 | Rao ..................... | H04L 45/7453 370/395.32 |
| 2006/0253613 A1* | 11/2006 | Leary .................. | H04L 41/0816 709/250 |

(Continued)

FOREIGN PATENT DOCUMENTS

| CN | 101030901 A | 9/2007 |
|---|---|---|
| CN | 101102249 A | 1/2008 |

(Continued)

OTHER PUBLICATIONS

IEEE 802.1CB d2-6 "Draft Standard for Local and metropolitan area networks, Frame Replication and Elimination for Reliability," 2016, 97 pages.

(Continued)

*Primary Examiner* — Kenny S Lin
(74) *Attorney, Agent, or Firm* — Conley Rose, P.C.

(57) ABSTRACT

A multicast packet transmission method, apparatus, and system, where the method is applied to a multicast ring network and the method includes receiving, by a first network node in the multicast ring network through a first path in a clockwise direction of the multicast ring network, a first multicast packet from a second network node in the multicast ring network, receiving, by the first network node through a second path in an anticlockwise direction of the multicast ring network, a second multicast packet from the second network node, where a payload of the first multicast packet is the same as a payload of the second multicast packet, and forwarding, by the first network node, the first multicast packet or the second multicast packet to at least one multicast destination device connected to the first network node.

20 Claims, 10 Drawing Sheets

(56) References Cited

U.S. PATENT DOCUMENTS

| | | | | |
|---|---|---|---|---|
| 2009/0201803 | A1* | 8/2009 | Filsfils | H04L 45/16 370/222 |
| 2010/0014527 | A1* | 1/2010 | Sakauchi | H04L 12/42 370/400 |
| 2011/0026394 | A1 | 2/2011 | Feng et al. | |
| 2011/0116508 | A1 | 5/2011 | Kirrmann | |
| 2012/0195311 | A1 | 8/2012 | Gupta et al. | |
| 2014/0313886 | A1* | 10/2014 | Yuan | H04L 45/50 370/228 |
| 2014/0359364 | A1* | 12/2014 | Sivasankar | H04L 49/557 714/37 |
| 2015/0381420 | A1* | 12/2015 | Kompella | H04L 47/76 370/222 |
| 2017/0134268 | A1* | 5/2017 | Easale | H04L 47/20 |

FOREIGN PATENT DOCUMENTS

| | | |
|---|---|---|
| CN | 101483491 A | 7/2009 |
| CN | 101989934 A | 3/2011 |
| CN | 102106121 A | 6/2011 |
| CN | 103023665 A | 4/2013 |
| CN | 103095539 A | 5/2013 |
| CN | 103269318 A | 8/2013 |
| CN | 103339899 A | 10/2013 |
| CN | 108155933 A | 6/2018 |

OTHER PUBLICATIONS

"Pseudo Wire Emulation Edge-to-Edge (PWE3) Architecture," RFC 3985, Mar. 2005, 42 pages.

"Pseudowire Emulation Edge-to-Edge (PWE3) Control Word for Use over an MPLS PSN," RFC 4385, Feb. 2006, 12 pages.

"Packet Pseudowire Encapsulation over an MPLS PSN," RFC 6658, Jul. 2012, 15 pages.

Karan, A., et al., "Multicast only Fast Re-Route," draft-karan-mofrr-00, Mar. 2, 2009, 13 pages.

\* cited by examiner

200

A first network node in the multicast ring network receives, through a first path in a clockwise direction of the multicast ring network, a first multicast packet sent by a second network node in the multicast ring network — S210

The first network node receives, through a second path in an anticlockwise direction of the multicast ring network, a second multicast packet sent by the second network node, where a payload of the first multicast packet is the same as a payload of the second multicast packet — S220

The first network node forwards the first multicast packet or the second multicast packet to at least one multicast destination device connected to the first network node — S230

The first network node processes the first multicast packet to obtain a third multicast packet, where the payload of the first multicast packet is the same as a payload of the third multicast packet; and sends the third multicast packet through the first path in the clockwise direction — S240

The first network node processes the second multicast packet to obtain a fourth multicast packet, where the payload of the second multicast packet is the same as a payload of the fourth multicast packet; and sends the fourth multicast packet through the second path in the anticlockwise direction — S250

FIG. 6

MULTICAST PACKET TRANSMISSION METHOD, APPARATUS, AND SYSTEM

CROSS-REFERENCE TO RELATED APPLICATIONS

This application is a continuation of International Patent Application No. PCT/CN2018/094950 filed on Jul. 9, 2018, which claims priority to Chinese Patent Application No. 201710891109.2 filed on Sep. 27, 2017, both of which are hereby incorporated by reference in their entireties.

TECHNICAL FIELD

This application relates to the communications field, and to a multicast packet transmission method, apparatus, and system in the communications field.

BACKGROUND

Generally, a multi-protocol label switching (MPLS) network uses fast reroute (FRR) to locally protect links or nodes on a label switching path (LSP), or protect a working LSP by establishing an end-to-end backup LSP. Once the working LSP fails, all information flows on the working LSP and all pseudowires (PWs) corresponding to the information flows are switched to the backup LSP. For example, a steering switching technology is a technology of switching, to a backup LSP, traffic flows on a working LSP and all PWs corresponding to the traffic flows. According the steering switching technology, when detecting that a link fails, a network node sends a switching request to all network nodes in a ring network using an Automatic Protection Switching (APS) protocol. For example, as shown in FIG. 1, an operation, administration, and maintenance (OAM) protocol needs to be run on each multicast path corresponding to a source network node in a ring network, and the OAM protocol is used to detect whether a link fails such that each node in the ring network on the multicast path needs to run the OAM protocol. This increases system overheads.

SUMMARY

This application provides a multicast packet transmission method, apparatus, and system, to reduce system overheads, and improve system performance.

According to a first aspect, a multicast packet transmission method is provided. The method is applied to a multicast ring network and the method includes receiving, by a first network node in the multicast ring network, through a first path in a clockwise direction of the multicast ring network, a first multicast packet sent by a second network node in the multicast ring network, receiving, by the first network node through a second path in an anticlockwise direction of the multicast ring network, a second multicast packet sent by the second network node, where a payload of the first multicast packet is the same as a payload of the second multicast packet, and forwarding, by the first network node, the first multicast packet or the second multicast packet to at least one multicast destination device connected to the first network node.

In the embodiments of this application, there may exist a multicast service in a clockwise direction and a multicast service in an anticlockwise direction in the multicast ring network. When a link in the multicast ring network fails, the first network node may receive a multicast packet. When no link in the multicast ring network fails, the first network node may receive two multicast packets, and the first network node may send one multicast packet of the two multicast packets to at least one target device connected to the first network node. In this way, it can be avoided to run an OAM protocol in the multicast ring network in other approaches, system overheads can be reduced, and system performance can be improved.

It should be understood that the receiving, by a first network node in the multicast ring network, through a first path in a clockwise direction of the multicast ring network, a first multicast packet sent by a second network node in the multicast ring network may be that the first network node directly receives the first multicast packet sent by the second network node, alternatively, the first network node may receive the first multicast packet sent by the second network node using another network node. Similarly, receiving, by the first network node through a second path in an anticlockwise direction of the multicast ring network, a second multicast packet sent by the second network node may be that the first network node directly receives the second multicast packet sent by the second network node, alternatively, the first network node may receive the second multicast packet sent by the second network node using another network node.

It should be understood that the first network node is connected to the at least one multicast destination device, in a wired or a wireless manner. This is not limited in this embodiment of this application.

In some implementations, the first multicast packet and the second multicast packet each include a second identifier, where the second identifier is used to identify that a payload of the first multicast packet is the same as a payload of the second multicast packet, forwarding, by the first network node, the first multicast packet or the second multicast packet to at least one multicast destination device connected to the first network node includes forwarding, by the first network node based on the second identifier, the first multicast packet or the second multicast packet to the at least one multicast destination device connected to the first network node.

That is, if two multicast packets have a same second identifier, the two multicast packets include a same payload. If the first network node receives two multicast packets at the same time, the first network node forwards one multicast packet of the two multicast packets to the at least one multicast destination device. If the first network node receives a first received multicast packet, the first network node sends the first received multicast packet to the at least one multicast destination device in order to avoid packet redundancy caused when the at least one multicast destination device receives two same multicast packets. Herein, the sending may be performed in a multicast manner.

Optionally, the second identifier may be a value of a specific field. When the values of the specific fields in the two multicast packets are the same, it indicates that the payloads of the two multicast packets are the same, and the first network node also stores the value of the specific field. When the values of the fields included in the two multicast packets received by the first network node are the same, it indicates that two same multicast packets are received, and one multicast packet is selectively received and forwarded to the at least one multicast destination device connected to the first network node.

In some implementations, the second identifier may be a sequence number. The sequence number is a sequence of the first multicast packet and the second multicast packet in a multicast traffic flow, and the multicast traffic flow includes at least one multicast packet. That is, if the first multicast packet and the second multicast packet include a same sequence number, it indicates that the two multicast packets include a same payload.

That is, there is a sending sequence between each multicast packet in a clockwise multicast traffic flow and an anticlockwise multicast traffic flow. It is assumed that there are N multicast packets in the clockwise multicast traffic flow, and there are also N multicast packets in the anticlockwise multicast traffic flow, where N is a positive integer greater than or equal to 1. In this case, a sequence of the first multicast packet in the clockwise multicast traffic flow is the same as a sequence of the second multicast packet in the anticlockwise multicast traffic flow. That is, the second identifier may be a sequence number, and the sequence number may represent a sequence of the multicast packet being sent in the multicast traffic flow. Optionally, the multicast packets with the same sequence number in the two directions may successively arrive at a same network node in the multicast ring network.

In some implementations, forwarding, by the first network node based on the second identifier, the first multicast packet or the second multicast packet to the at least one multicast destination device connected to the first network node includes forwarding, by the first network node based on the second identifier, the first received multicast packet in the first multicast packet and the second multicast packet to the at least one multicast destination device.

In some implementations, the first multicast packet and the second multicast packet each include a first identifier, where the first identifier is a path label or a service label, or the first identifier is a combination of a path label and a service label, and before forwarding, by the first network node, the first multicast packet or the second multicast packet to at least one multicast destination device connected to the first network node, the method further includes determining, by the first network node based on the first identifiers, that the first multicast packet and the second multicast packet need to be forwarded to the at least one multicast destination device connected to the first network node.

In the embodiments of this application, the first identifier may be added to the clockwise multicast traffic flow, and the first identifier may also be added to the anticlockwise multicast traffic flow. The first network node also stores the first identifier, and only the multicast packet with the first identifier can be forwarded to the at least one multicast destination device.

In some implementations, the first identifier of the first multicast packet is a first service label, and the first identifier of the second multicast packet is a second service label, determining, by the first network node based on the first identifiers, that the first multicast packet and the second multicast packet need to be forwarded to the at least one multicast destination device connected to the first network node includes determining, by the first network node based on the first service label, that the first multicast packet needs to be forwarded to the at least one multicast destination device connected to the first network node, and determining, by the first network node based on the second service label, that the second multicast packet needs to be forwarded to the at least one multicast destination device connected to the first network node.

In some implementations, the first path and the second path are label forwarding paths or PWs.

In some implementations, after receiving, by a first network node in the multicast ring network, through a first path in a clockwise direction of the multicast ring network, a first multicast packet sent by a second network node in the multicast ring network, the method further includes processing, by the first network node, the first multicast packet to obtain a third multicast packet, where the payload of the first multicast packet is the same as a payload of the third multicast packet, and sending, by the first network node, the third multicast packet through the first path in the clockwise direction. Optionally, the first network node processes the first multicast packet. In this way, the first multicast packet and the third multicast packet may include the same payload. Optionally, packet headers of the first multicast packet and the third multicast packet may be different.

In some implementations, after receiving, by the first network node through a second path in an anticlockwise direction of the multicast ring network, a second multicast packet sent by the second network node, the method further includes processing, by the first network node, the second multicast packet to obtain a fourth multicast packet, where the payload of the second multicast packet is the same as a payload of the fourth multicast packet, and sending, by the first network node, the fourth multicast packet through the second path in the anticlockwise direction. Optionally, the first network node processes the second multicast packet such that the second multicast packet and the fourth multicast packet may include the same payload. Optionally, packet headers of the second multicast packet and the fourth multicast packet may be different.

In some implementations, forwarding, by the first network node, the first multicast packet or the second multicast packet to at least one multicast destination device connected to the first network node includes forwarding, by the first network node in an Ethernet multicast mode or an Internet Protocol (IP) multicast manner, the first multicast packet or the second multicast packet to the at least one multicast destination device connected to the first network node.

According to a second aspect, a multicast packet transmission method is provided. The method is applied to a multicast ring network and the method includes receiving, by a second network node in the multicast ring network, a multicast traffic flow sent by a multicast source device, where the multicast traffic flow includes at least one multicast packet, processing, by the second network node, a multicast packet in the at least one multicast packet to obtain a first multicast packet and a second multicast packet, where a payload of the first multicast packet is the same as a payload of the second multicast packet, sending, by the second network node, the first multicast packet through a first path in a clockwise direction of the multicast ring network, and sending, by the second network node, the second multicast packet through a second path in an anticlockwise direction of the multicast ring network.

In some implementations, after processing, by the second network node, a multicast packet in the at least one multicast packet to obtain a first multicast packet and a second multicast packet, the method further includes adding, by the second network node, a same second identifier to the first multicast packet and the second multicast packet, where the second identifier is used to identify that the payload of the first multicast packet is the same as the payload of the second multicast packet.

In some implementations, the second identifier is used to identify a sequence of the first multicast packet and the second multicast packet in the multicast traffic flow.

In some implementations, the method further includes adding, by a first network node, a first identifier to the at least one multicast packet, where the first identifier is a path label or a service label, or the first identifier is a combination of a path label and a service label.

In some implementations, the first path and the second path are label forwarding paths or PWs.

According to a third aspect, a multicast packet transmission method is provided, where the method is applied to a multicast ring network and the method includes receiving, by a second network node in the multicast ring network, a multicast traffic flow sent by a multicast source device, where the multicast traffic flow includes at least one multicast packet, processing, by the second network node, a multicast packet in the at least one multicast packet to obtain a first multicast packet and a second multicast packet, where a payload of the first multicast packet is the same as a payload of the second multicast packet, sending, by the second network node, the first multicast packet through a first path in a clockwise direction of the multicast ring network, sending, by the second network node, the second multicast packet through a second path in an anticlockwise direction of the multicast ring network, receiving, by a first network node in the multicast ring network, through the first path in the clockwise direction, the first multicast packet sent by the second network node, and/or receiving, through the second path in the anticlockwise direction, the first multicast packet sent by the second network node, and forwarding, by the first network node, the first multicast packet or the second multicast packet to at least one multicast destination device connected to the first network node.

In some implementations, after processing, by the second network node, a multicast packet in the at least one multicast packet to obtain a first multicast packet and a second multicast packet, the method further includes adding, by the second network node, a same second identifier to the first multicast packet and the second multicast packet, where the second identifier is used to identify that the payload of the first multicast packet is the same as the payload of the second multicast packet, and if receiving, by a first network node, through the first path in the clockwise direction, the first multicast packet sent by the second network node, and receiving, through the second path in the anticlockwise direction, the first multicast packet sent by the second network node, forwarding, by the first network node, the first multicast packet or the second multicast packet to at least one multicast destination device connected to the first network node includes forwarding, by the first network node based on the second identifier, the first multicast packet or the second multicast packet to the at least one multicast destination device connected to the first network node.

In some implementations, the second identifier may be a sequence number, where the sequence number is a sequence of the first multicast packet and the second multicast packet in the multicast traffic flow. That is, if the first multicast packet and the second multicast packet include a same sequence number, it indicates that the two multicast packets include a same payload.

In some implementations, forwarding, by the first network node based on the second identifier, the first multicast packet or the second multicast packet to the at least one multicast destination device connected to the first network node includes forwarding, by the first network node based on the second identifier, a first received multicast packet in the first multicast packet and the second multicast packet to the at least one multicast destination device.

In some implementations, the method further includes adding, by the second network node, a first identifier to the at least one multicast packet, where the first identifier is a path label or a service label, or the first identifier is a combination of a path label and a service label, and before forwarding, by the first network node, the first multicast packet or the second multicast packet to at least one multicast destination device connected to the first network node, the method further includes determining, by the first network node based on the first identifier, that the first multicast packet and/or the second multicast packet need/needs to be forwarded to the at least one multicast destination device connected to the first network node.

In some implementations, a third network node in the multicast ring network is a network node connected to the second network node in an anticlockwise direction, and the method further includes receiving, by the third network node, the first multicast packet through the first path in the clockwise direction, and discarding, by the third network node, the first multicast packet. That is, the third network node does not send the first multicast packet to the second network node.

That is, the third network node is a termination node in the clockwise direction. In this way, a clockwise multicast traffic flow can be terminated in order to avoid a cycle caused by the multicast traffic flow being sent to the second network node again.

In some implementations, a fourth network node in the multicast ring network is a network node connected to the second network node in a clockwise direction, and the method further includes receiving, by the fourth network node, the second multicast packet through the second path in the anticlockwise direction, and discarding, by the fourth network node, the second multicast packet. That is, the fourth network node does not send the second multicast packet to the second network node.

That is, the fourth network node is a termination node in the anticlockwise direction. In this way, an anticlockwise multicast traffic flow can be terminated in order to avoid a cycle caused by the multicast traffic flow being sent to the second network node again.

According to a fourth aspect, a multicast packet transmission apparatus is provided. The apparatus is configured to perform the foregoing method of the first aspect or any one of the possible implementations of the first aspect. The apparatus includes a unit configured to perform the foregoing method of the first aspect or any one of the possible implementations of the first aspect.

According to a fifth aspect, a multicast packet transmission apparatus is provided, where the apparatus is configured to perform the foregoing method of the second aspect or any one of the possible implementations of the second aspect. The apparatus includes a unit configured to perform the foregoing method of the second aspect or any one of the possible implementations of the second aspect.

According to a sixth aspect, a multicast packet transmission apparatus is provided, where the apparatus includes a communications interface, a memory, and a processor. The communications interface, the memory, and the processor communicate with each other through an internal connection channel. The memory is configured to store an instruction. The processor is configured to execute the instruction stored in the memory, to control the receiver to receive a signal and control the transmitter to send a signal. In addition, when the processor executes the instruction stored in the memory, the execution enables the processor to execute the method of the first aspect or any one of the possible implementations of the first aspect.

According to a seventh aspect, a multicast packet transmission apparatus is provided, where the apparatus includes a communications interface, a memory, and a processor. The communications interface, the memory, and the processor communicate with each other through an internal connection channel. The memory is configured to store an instruction. The processor is configured to execute the instruction stored in the memory, to control the receiver to receive a signal and control the transmitter to send a signal. In addition, when the processor executes the instruction stored in the memory, the execution enables the processor to execute the method of the second aspect or any one of the possible implementations of the second aspect.

According to an eighth aspect, a multicast packet transmission system is provided, where the system includes the apparatus of the fourth aspect or any one of the possible implementations of the fourth aspect, and the apparatus of the fifth aspect or any one of the possible implementations of the fifth aspect. Optionally, the system includes the apparatus of the sixth aspect or any one of possible implementations of the sixth aspect, and the apparatus of the seventh aspect or any one of possible implementations of the seventh aspect.

According to a ninth aspect, a computer readable storage medium is provided. The computer readable storage medium stores an instruction. When the instruction is run on a computer, the computer is enabled to perform the method of the first aspect or any one of the possible implementations of the first aspect.

According to a tenth aspect, a computer readable storage medium is provided. The computer readable storage medium stores an instruction. When the instruction is run on a computer, the computer is enabled to perform the method of the second aspect or any one of the possible implementations of the second aspect.

According to an eleventh aspect, a computer program product including an instruction is provided. When the instruction is run on a computer, the computer is enabled to perform the method of the first aspect or any one of the possible implementations of the first aspect.

According to a twelfth aspect, a computer program product including an instruction is provided. When the instruction is run on a computer, the computer is enabled to perform the method of the second aspect or any one of the possible implementations of the second aspect.

BRIEF DESCRIPTION OF DRAWINGS

FIG. 6 is a schematic diagram of another multicast packet transmission method according to an embodiment of this application;

DESCRIPTION OF EMBODIMENTS

The following describes technical solutions of this application with reference to accompanying drawings.

Figure 1:
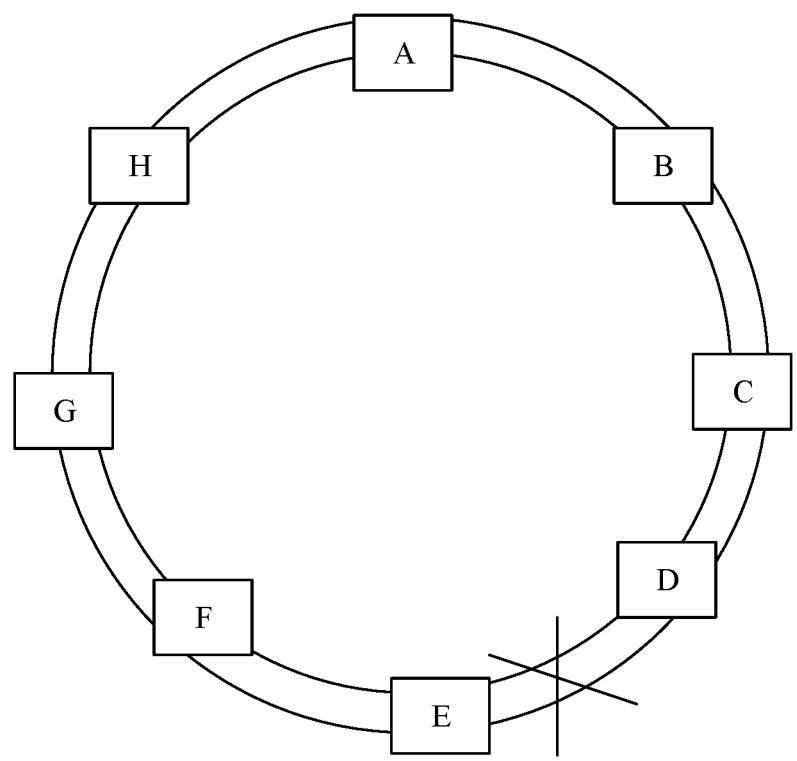
FIG. 1 is a schematic diagram of an application scenario of a multicast packet transmission.
Figure 2:
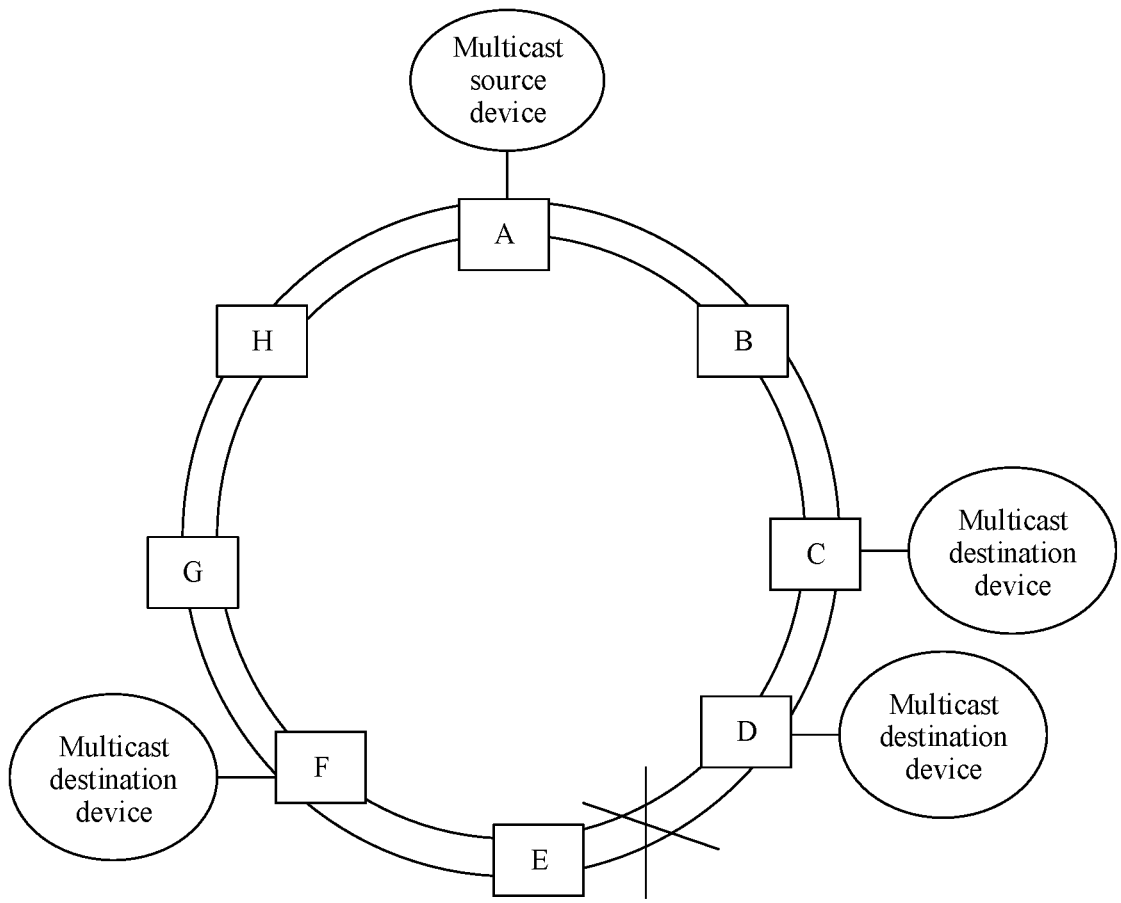
FIG. 2 is a schematic diagram of an application scenario according to an embodiment of this application.

FIG. 2 is a schematic diagram of a scenario according to an embodiment of this application. A multicast ring network in FIG. 2 includes a second network node A (which may also be referred to as a root network node), first network nodes C, D, and F (which may also be referred to as leaf network nodes), intermediate network nodes E and G, and termination network nodes B and H. The second network node A, the termination network node B, the first network node C, the first network node D, the intermediate network node E, the first network node F, the intermediate network node G, and the termination network node H are connected sequentially in a clockwise direction to form a ring, the second network node A is connected to a multicast source device, and the first network nodes C, D, and F are separately connected to a multicast destination device.

In the embodiments of this application, a "node" may refer to a device that forwards a multicast packet in the foregoing multicast ring network. For example, the "node" may be a router, a switch, an optical transport network (OTN) device, a packet transport network (PTN) device, or a wavelength division multiplexing (WDM) device.

The second network node A selects a direction (a clockwise direction or an anticlockwise direction) to send a traffic flow. For example, a clockwise direction A-B-C-D is selected to send the traffic flow. An OAM protocol needs to be run between any two network nodes in the multicast ring network to detect whether a link fails. If a link fails between the first network node D and the intermediate network node E, the first network node D or the intermediate network node E sends fault information to the second network node A, and the node A can take a protection measure only after receiving the fault information. This causes a specific delay in the sent traffic flow, and running the OAM protocol increases signaling overheads.

Therefore, according to a multicast packet transmission method provided in the embodiments of this application, a multicast traffic flow (where the multicast traffic flow may include at least one multicast packet) may be sent in a clockwise direction (A-B-C-D-E-F-G-H) and an anticlockwise direction (A-H-G-F-E-D-C-B). In this case, even if a link fails between the first network node D and the intermediate network node E, the termination network node B and the first network nodes C and D can still receive the multicast traffic flow sent in the clockwise direction, and the intermediate network nodes E and G, the termination network node H, and the first network node F can still receive the multicast traffic flow sent in the anticlockwise direction. In this case, even if the link between the first network node D and the intermediate network node E fails, the termination network nodes B, the first network nodes C and D, the intermediate network nodes E and G, the termination network node H, and the first network node F can still normally receive the multicast traffic flow, and there is no need to run the OAM protocol between any two network nodes in the multicast ring network. This can reduce system overheads. Further, the second network node A simultaneously sends the multicast traffic flow in two directions, and this can avoid a delay in receiving a multicast packet.

It should be understood that, the multicast ring network in the embodiments of this application may be a ring network including a plurality of network nodes. Some network nodes are connected to a multicast source device, some network nodes are connected to at least one multicast destination device, and some network nodes are not connected to any device and are only responsible for forwarding a multicast packet. The multicast source device may transmit the multicast packet to the at least one multicast destination device using the network nodes in the multicast ring network.

The following describes a schematic diagram of the application scenario in FIG. 2.

The multicast source device is configured to send the multicast traffic flow to the second network node A. The multicast traffic flow includes at least one multicast packet. The multicast source device may be a device such as a multicast service server, a multicast egress gateway of an enterprise, or a data center. A connection link from the multicast source device to the second node A may be an Ethernet link, an OTN link or another physical link or logical link, or the like. This is not limited in this embodiment of this application.

The multicast destination device is configured to receive, using the first network node, the multicast traffic flow sent by the multicast source device. The multicast destination device may also be referred to as a multicast leaf device, and the multicast destination device may be an enterprise gateway, a cloud website, a router on a network side, a switch on a network side, a personal subscriber device, or the like. The connection link from the multicast destination device to the first network node may be an Ethernet link, an OTN link or another physical or logical link, or the like. This is not limited in this embodiment of this application.

Figure 3:
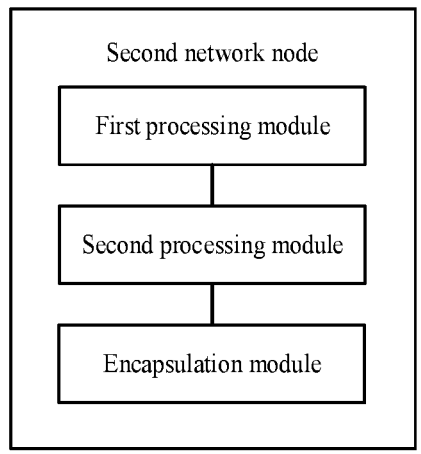
FIG. 3 is a schematic block diagram of a second network node according to an embodiment of this application.

The second network node A is a node, connected to the multicast source device, in the multicast ring network, and the second network node A is configured to receive the multicast traffic flow sent by the multicast source device, process packets in the received multicast traffic flow to obtain two multicast packets with a same payload, send the two multicast packets separately in the clockwise direction and the anticlockwise direction, and transmit the packets in the multicast traffic flow to the multicast destination device using the network nodes in the multicast ring network. Optionally, the second network node A may be a network provider edge (PE) or an operator network device in an IP/MPLS ring network. For example, as shown in FIG. 3, the second network node A includes an encapsulation module, a first processing module, a second processing module, and the like. The second processing module is configured to encapsulate an IP service or an MPLS service to form an Ethernet frame. Optionally, the second network node A may not include a second processing module, but directly encapsulate an IP service, an MPLS service, or an Ethernet service using the encapsulation module. The encapsulation module is configured to encapsulate the multicast packets in the received multicast traffic flow, and the first processing module is configured to perform a first processing operation on the multicast packets. Two multicast packets with a same payload may be obtained after the first processing operation. Optionally, the first processing operation may be performed after the encapsulation, or the first processing operation may be performed before the encapsulation. For example, the encapsulation may be an operation such as adding a sequence number, or adding a path label or a service label.

The first network nodes C, D, and F are nodes, connected to multicast destination devices, in the ring network. The first network nodes C, D, and F are configured to receive a multicast packet sent by the second network node A in the clockwise direction, and the first network nodes C, D, and F process the multicast packet in the clockwise direction, and forward the processed multicast packet to a next network node in the clockwise direction. Optionally, the payload of the multicast packet before processing may be the same as that of the multicast packet obtained after processing. Optionally, the plurality of first network nodes C, D, and F are further configured to receive a multicast packet sent by the second network node A in the anticlockwise direction, and the second network nodes C, D, and F process the multicast packet in the anticlockwise direction, and forward the processed multicast packet to a next network node in the anticlockwise direction. Optionally, the payload of the multicast packet before processing may be the same as that of the multicast packet obtained after processing. The multicast packet sent in the clockwise direction and the multicast packet sent in the anticlockwise direction are multicast packets with the same payload. The plurality of first network nodes C, D, and F are further configured to send a multicast packet in the clockwise direction or a multicast packet in the anticlockwise direction to the multicast destination devices connected to the first network nodes. For example, the first network node C receives a multicast packet sent by the termination network node B in the clockwise direction, processes the multicast packet sent by the termination network node B, and forwards the multicast packet to the first network node D. The first network node C receives a multicast packet sent by the first network node D in the anticlockwise direction, processes the multicast packet sent by the first network node D, and forwards the multicast packet to the termination network node B. The first network node C sends the multicast packet received in the clockwise direction or the multicast packet received in the anticlockwise direction to a multicast destination device connected to the first network node C. For example, if the first network node C first receives the multicast packet sent in the clockwise direction, the first network node C sends the multicast packet in the clockwise direction to the multicast destination device connected to the first network node C. If the first network node C first receives the multicast packet sent in the anticlockwise direction, the first network node C sends the multicast packet in the anticlockwise direction to the multicast destination device connected to the first network node C. Optionally, the first network node may be a network PE or an operator network device in the IP/MPLS ring network.

Figure 4:
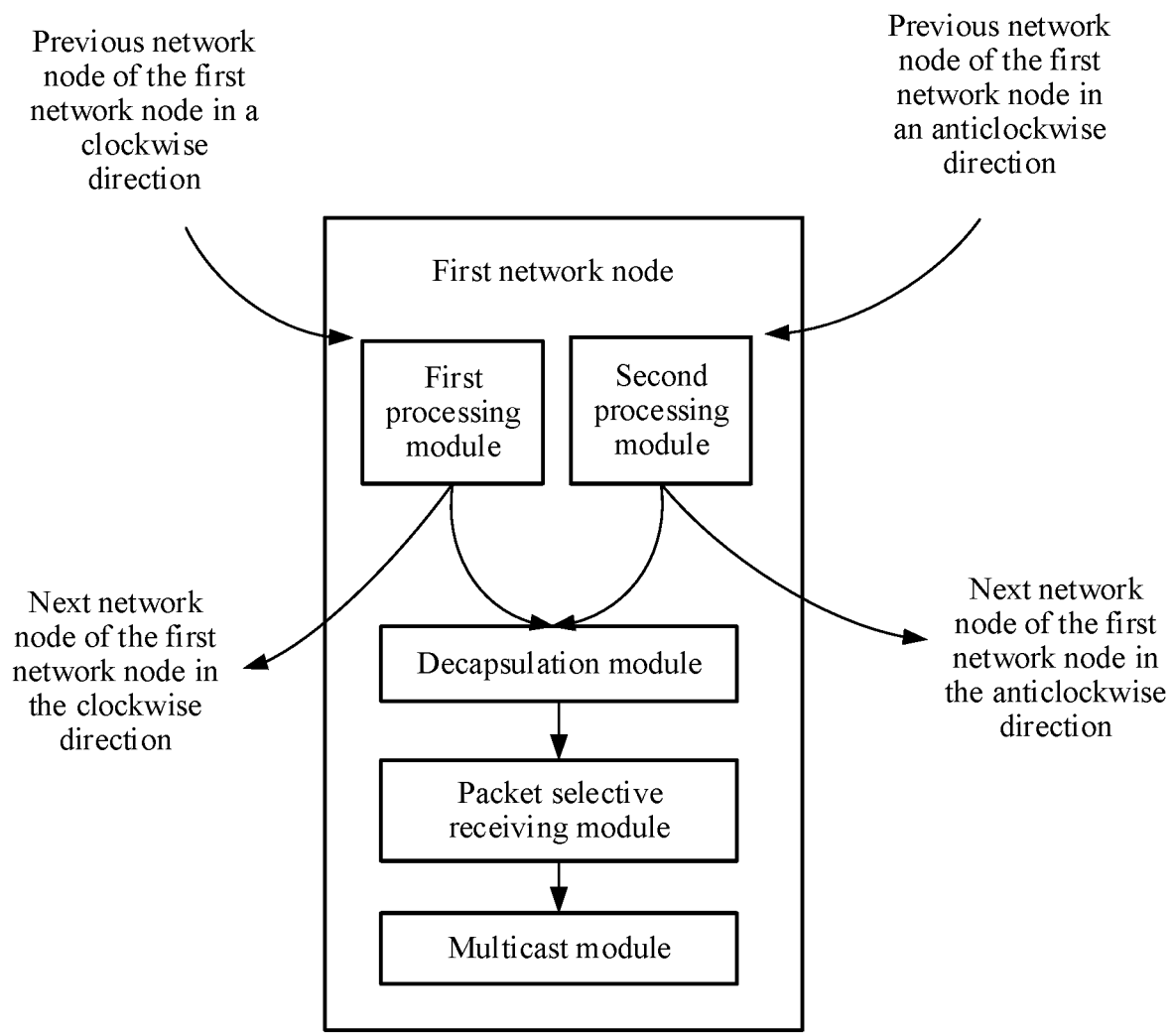
FIG. 4 is a schematic block diagram of a first network node according to an embodiment of this application.

Optionally, as shown in FIG. 4, the first network node may include a first processing module, a second processing module, a decapsulation module, a packet selective receiving module, and a multicast module. The first processing module is configured to process a multicast packet from a previous network node of the first network node in the clockwise direction, to obtain two multicast packets with a same payload, and continue to forward one of the multicast packets to a next network node of the first network node in the clockwise direction, where the other multicast packet enters the decapsulation module. The second processing module is configured to process a multicast packet from a previous network node of the first network node in the anticlockwise direction, to obtain two multicast packets with a same payload, and continue to forward one of the multicast packets to a next network node of the first network node in the anticlockwise direction, where the other multicast packet enters the decapsulation module. The decapsulation module is configured to decapsulate the received multicast packets. The packet selective receiving module may selectively receive one multicast packet from the multicast packet received in the clockwise direction and the multicast packet that is received in the anticlockwise direction and that is the same as that received in the clockwise direction. The multicast module is configured to send, in a multicast manner, the multicast packet selectively received by the packet selective receiving module. Optionally, if the first network node receives two multicast packets with different service labels, the two multicast packets with the different service labels may be mapped to the same packet selective receiving module, and selective receiving is performed according to a sequence number carried in each multicast packet. It is assumed that the first network node receives two multicast packets, and each multicast packet includes a sequence number. If the sequence numbers of the two multicast packets are the same, it indicates that the two multicast packets are multicast packets with a same payload. In this case, the first network node sends only one of the two multicast packets to the at least one multicast destination device connected to the first network node, and discards the other multicast packet.

The intermediate network nodes E and G are configured to forward a multicast traffic flow, and if an intermediate network node is not connected to a multicast destination device, the intermediate network node may transparently transmit a multicast traffic flow to a next network node.

The termination network node B is configured to discard a multicast traffic flow received in the anticlockwise direction. If the termination network node B is further connected to a multicast destination device, in addition to terminating the traffic flow received in the anticlockwise direction, the termination network node B further needs to send, to all the multicast destination devices connected to the termination network node B, the multicast traffic flow received in the anticlockwise direction or a multicast traffic flow received in the clockwise direction. If the termination network node B is further connected to a multicast destination device, the termination network node B includes a decapsulation module, a packet selective receiving module, a multicast module, and a first processing module. These modules have same functions as the first network node.

The termination network node H is configured to discard a traffic flow received in the clockwise direction. If the termination network node H is further connected to a multicast destination device, in addition to terminating the traffic flow received in the clockwise direction, the termination network node H further needs to send, to all the multicast destination devices connected to the termination network node H, the multicast traffic flow received in the anticlockwise direction or a multicast traffic flow received in the clockwise direction. If the termination network node H is further connected to a multicast destination device, the termination network node B includes a decapsulation module, a packet selective receiving module, a multicast module, and a second processing module. These modules have same functions as the first network node.

It should be understood that FIG. 2 shows an example in which one first network node is connected to one multicast destination device. Optionally, one network node may be connected to one or more multicast destination devices. The foregoing sending is sending to, in a multicast mode, all the multicast destination devices connected to the first network node.

It should also be understood that, in the embodiments of this application, the multicast traffic flow between the multicast source device and the multicast destination device may be Ethernet services. For example, as shown in FIG. 2, when the services need to be transmitted in the MPLS network, first, two point-to-multipoint (P2MP) PWs need to be established from the second network node A to the first network nodes C, D and F: a PW in the clockwise direction and a PW in the anticlockwise direction, and the multicast traffic flow is transmitted through the P2MP PWs, where the P2MP PWs may be carried through a P2MP LSP.

Figure 5:
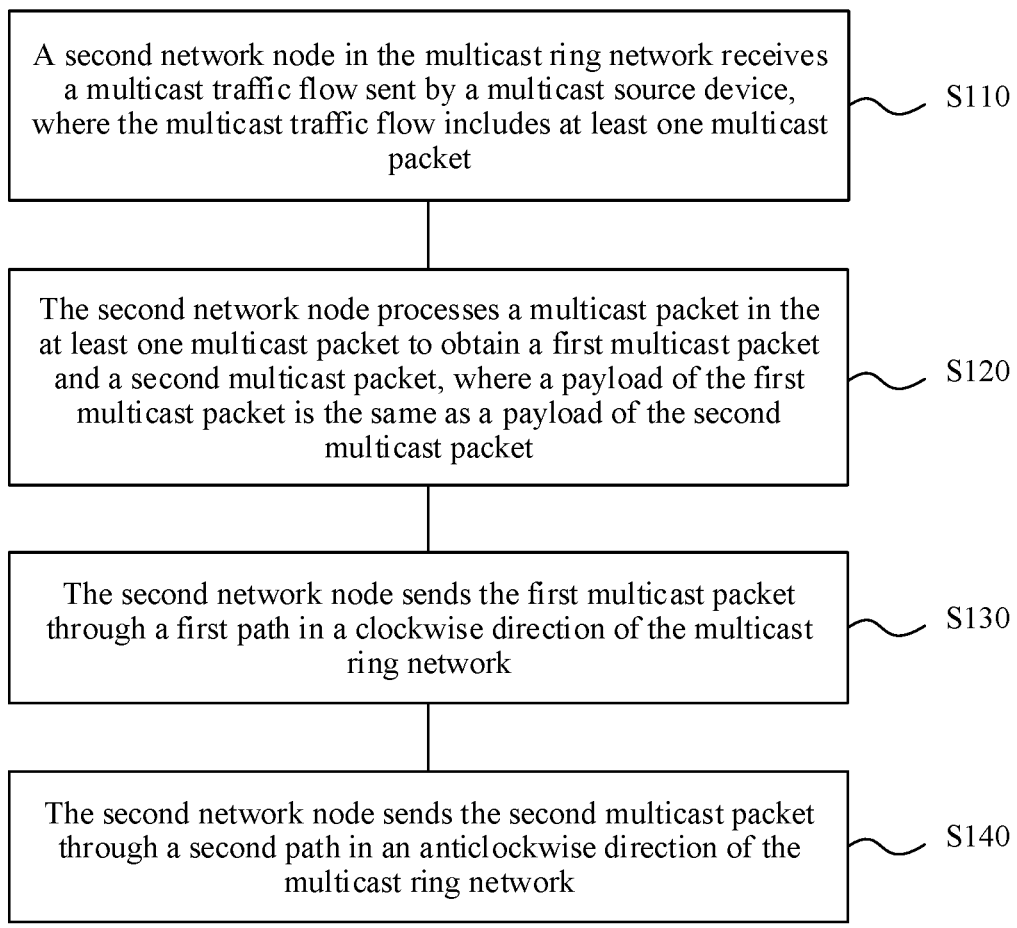
FIG. 5 is a schematic diagram of a multicast packet transmission method according to an embodiment of this application.

FIG. 5 shows a multicast packet transmission method 100 according to an embodiment of this application. The method 100 is applied to a multicast ring network, and the method 100 includes the following steps.

Step S110: A second network node in the multicast ring network receives a multicast traffic flow sent by a multicast source device, where the multicast traffic flow includes at least one multicast packet, and the at least one multicast packet may be an IP packet or an Ethernet frame.

Step S120: The second network node processes a multicast packet in the at least one multicast packet to obtain a first multicast packet and a second multicast packet, where a payload of the first multicast packet is the same as a payload of the second multicast packet. Optionally, the multicast packet is any one multicast packet in the multicast traffic flow. Optionally, the second network node may process each multicast packet in the multicast traffic flow, and then respectively send the two multicast packets with the same payload in a clockwise direction or in an anticlockwise direction. The following provides description using only an example in which the first multicast packet and the second multicast packet are the processed multicast packets with the same payload. Another multicast packet in the at least one multicast packet is similar to the first multicast packet or the second multicast packet.

In an optional embodiment, after step S120, the method includes adding, by the second network node, a same second identifier to the first multicast packet and the second multicast packet. The second identifier is used to identify that the payload of the first multicast packet is the same as the payload of the second multicast packet. Optionally, the second identifier may be a sequence number. The sequence number is a sequence of the first multicast packet and the second multicast packet in the multicast traffic flow.

In an optional embodiment, the method further includes adding, by the second network node, a first identifier to the at least one multicast packet. The first identifier is a path label or a service label, or the first identifier is a combination of a path label and a service label. That is, the first identifier is used to identify that each of the at least one multicast packet sent by the multicast source device includes one first identifier. Optionally, a service label of the first multicast packet may be the same as or different from a service label of the second multicast packet. Optionally, path labels of the first multicast packet and the second multicast packet may be different.

Step S130: The second network node sends the first multicast packet through a first path in the clockwise direction of the multicast ring network.

Step S140: The second network node sends the second multicast packet through a second path in the anticlockwise direction of the multicast ring network.

Optionally, the first path and the second path are label forwarding paths or PWs. When the multicast packet is an IP packet, the first identifier may be an LSP path label, and the first multicast packet and the second multicast packet can be forwarded on the label forwarding paths, for example, by encapsulating a generalized associated channel (G-ACH) header and the LSP path label. Optionally, when the multicast packet is an IP packet, the first identifier may alternatively be a combination of a path label and a PW label. That is, the IP packet is first encapsulated to form an Ethernet frame, and then forwarded on the Ethernet PW. For example, an Ethernet PW control word, a PW label, and the LSP path label may be sequentially encapsulated onto the IP packet. Optionally, when the multicast packet is an IP packet, the first identifier may alternatively be a layer 3 virtual private network (L3VPN) service label, and the first multicast packet and the second multicast packet may be forwarded through an L3VPN label forwarding path. For example, the G-ACH, the L3VPN service label, and the LSP path label may be sequentially encapsulated onto the IP packet. When the multicast packet is an Ethernet packet, the first identifier may be a combination of the path label and the PW label. That is, the first multicast packet and the second multicast packet may be encapsulated onto an Ethernet service PW for forwarding. For example, an Ethernet PW control word, a PW label, and the LSP path label may be sequentially encapsulated onto the IP packet.

Therefore, in this embodiment of this application, after receiving the multicast traffic flow sent by the multicast source device or when receiving the multicast traffic flow sent by the multicast source device, the second network node processes the multicast packet in the multicast traffic flow to obtain the two multicast packets with the same payloads, and sends the two multicast packets separately in the clockwise direction and in the anticlockwise direction. In this case, even if an intermediate network node or a link fails in the multicast ring network, each leaf network node (which may also be referred to as the first network node) in the multicast ring network can also receive a multicast packet. This avoids a phenomenon that an OAM protocol is required to detect a fault, can reduce system overheads, and helps reduce a delay.

After receiving, through the first path, the first multicast packet sent by the second network node in the clockwise direction, the intermediate network node may forward the first multicast packet to the first network node, or if the first network node is directly connected to the second network node, the first network node may directly receive the first multicast packet sent by the second network node. Optionally, after receiving, through the second path, the second multicast packet sent by the second network node in the anticlockwise direction, the intermediate network node may forward the second multicast packet to the first network node, or if the first network node is directly connected to the second network node, the first network node may directly receive the second multicast packet sent by the second network node. The following describes related steps performed by a first network node.

FIG. 6 shows a multicast packet transmission method 200 according to an embodiment of this application. The method 200 is applied to a multicast ring network, and the method 200 may be executed by a first network node in the multicast ring network. The method 200 includes the following steps.

Step S210: The first network node in the multicast ring network receives, through a first path in a clockwise direction of the multicast ring network, a first multicast packet sent by a second network node in the multicast ring network.

Step S220: The first network node receives, through a second path in an anticlockwise direction of the multicast ring network, a second multicast packet sent by the second network node, where a payload of the first multicast packet is the same as a payload of the second multicast packet.

Step S230: The first network node forwards the first multicast packet or the second multicast packet to at least one multicast destination device connected to the first network node. It should be understood that the first network node and the at least one multicast destination device herein may be connected in a wired or a wireless manner. This is not limited in this embodiment of this application.

When no link in the multicast ring network fails, the first network node may receive the first multicast packet sent by the second network node in the clockwise direction, and may also receive the second multicast packet sent by the second network node in the anticlockwise direction. The first network node forwards one of the first multicast packet and the second multicast packet to the at least one multicast destination device connected to the first network node.

Further, when a link in the multicast ring network fails (for example, a link between D and E fails), the first network node (for example, a node C or D) can still receive the first multicast packet sent in the clockwise direction, but cannot receive the second multicast packet sent in the anticlockwise direction. That is, the first network node receives only one multicast packet, and the first network node sends the received multicast packet to the at least one multicast destination device connected to the first network node.

In an optional embodiment, the first multicast packet and the second multicast packet each include a second identifier, where the second identifier is used to identify that the first multicast packet and the second multicast packet are multicast packets with the same payload. For example, the second identifier is a label or a sequence number. This is not limited in this embodiment of this application. When the first network node receives the first multicast packet and the second multicast packet, step S230 includes forwarding, by the first network node based on the second identifier, the first multicast packet or the second multicast packet to the at least one multicast destination device connected to the first network node. Optionally, the first network node may determine the second identifier or store the second identifier. The first network node identifies the received multicast packet using the stored second identifier, the first network node has received the multicast packet identified by the second identifier, and when the first network node receives the multicast packet identified by the second identifier again, the first network node discards the later received multicast packet. To be specific, the first network node does not send the later received multicast packet to the at least one multicast destination device connected to the first network node.

Optionally, the sequence number is a sequence of the first multicast packet and the second multicast packet in the multicast traffic flow. It is assumed that the multicast traffic flow includes 100 multicast packets. If the first multicast packet is the $50^{th}$ of the 100 multicast packets in a sending sequence, the sequence number may indicate that the sequence of the first multicast packet in the multicast traffic flow is the $50^{th}$. The second multicast packet in the multicast service flow is the $50^{th}$ in the multicast traffic flow. The first network node also stores a sequence number of each of the 100 multicast packets. When the first network node receives the first multicast packet, the first network node determines that the sequence of the first multicast packet indicated by the sequence number of the first multicast packet, is the 50$^{th}$ in the multicast service flow. The first network node determines whether there is a previously received multicast packet of a sequence as the 50$^{th}$. If there is one, the first network node discards the first multicast packet, to be specific, the first network node does not send the first multicast packet to the at least one multicast destination device connected to the first network node, or if there is not, the first network node sends the first multicast packet to the at least one multicast destination device connected to the first network node. For example, the first network node stores 100 bits sequentially, and each bit corresponds to a multicast packet. If the first network node does not receive the multicast packet, a value of a bit corresponding to the multicast packet is 0. If the first network node receives the multicast packet, the first network node sets, to 1, the value of the bit corresponding to the multicast packet. In this case, when the first network node receives the multicast packet again, the value of the bit corresponding to the multicast packet is 1, which indicates that the multicast packet has been received. The multicast packet received this time is discarded, to be specific, the multicast packet received this time is not forwarded to the multicast destination device. Optionally, the first network node sends the first received multicast packet in the first multicast packet and the second multicast packet to the at least one multicast destination device connected to the first network node, and discards the later received multicast packet. To be specific, the first network node does not send the later received multicast packet to the at least one multicast destination device connected to the first network node.

In an optional embodiment, first identifiers are respectively added to the first multicast packet and the second multicast packet. Before step S230, the method 200 further includes determining, by the first network node based on the first identifiers, that the first multicast packet and/or the second multicast packet need/needs to be forwarded to the at least one multicast destination device connected to the first network node. The first identifier is a path label or a service label, or the first identifier is a combination of a path label and a service label. When receiving the multicast traffic flow sent by a multicast source device, the second network node first processes the multicast traffic flow and then adds the first identifier. That is, all the multicast packets in the multicast traffic flow have the same first identifier, and the first network node stores the first identifier. After identifying a multicast packet carrying the first identifier, the first network node selectively receives the multicast packet carrying the first identifier using the second identifier.

In an optional embodiment, the first identifier of the first multicast packet is a first service label, and the first identifier of the second multicast packet is a second service label. Determining, by the first network node based on the first identifiers, that the first multicast packet and the second multicast packet need to be forwarded to the at least one multicast destination device connected to the first network node includes determining, by the first network node based on the first service label, that the first multicast packet needs to be forwarded to the at least one multicast destination device connected to the first network node, and determining, by the first network node based on the second service label, that the second multicast packet needs to be forwarded to the at least one multicast destination device connected to the first network node.

Assuming that the first identifier is a path label, the path label of the first multicast packet may be different from that of the second multicast packet. When receiving the first multicast packet and the second multicast packet, the first network node performs selective receiving, and selectively receives one multicast packet and sends the multicast packet, in a multicast manner, to the at least one multicast destination device. Assuming that the first identifier is a service label, the service label of the first multicast packet may be the same as or different from the service label of the second multicast packet. When the service label of the first multicast packet is the same as the service label of the second multicast packet, the first network node stores the same service labels. When receiving the first multicast packet and the second multicast packet, the first network node selectively receives one of the first multicast packet and the second multicast packet based on the stored same service label. When the service label of the first multicast packet is a first service label, the service label of the second multicast packet is a second service label, and the first service label is different from the second service label, the first network node determines, based on the first service label stored by the first network node, that the first multicast packet can be forwarded to the at least one multicast destination device, and the first network node determines, based on the second service label stored by the first network node, that the second multicast packet can be forwarded to the at least one multicast destination device. However, only one of the first multicast packet and the second multicast packet can be forwarded to the at least one multicast destination device. When it may be determined, based on the second identifier, that the payload included in the first multicast packet is the same as the payload included in the second multicast packet, the first network node forwards the first received multicast packet to the at least one multicast destination device.

In an optional embodiment, if the first network node is not a network node connected to the second network node in the anticlockwise direction, after step S210, the method further includes step S240 in which the first network node processes the first multicast packet to obtain a third multicast packet, where the payload of the first multicast packet is the same as a payload of the third multicast packet, and sends the third multicast packet through the first path in the clockwise direction. Optionally, if the first network node is not a network node connected to the second network node in the clockwise direction, after step S220, the method further includes step S250 in which the first network node processes the second multicast packet to obtain a fourth multicast packet, where the payload of the second multicast packet is the same as a payload of the fourth multicast packet, and sends the fourth multicast packet through the second path in the anticlockwise direction.

In an optional embodiment, if the first network node is a network node connected to the second network node in the anticlockwise direction, after step S210, the first network node neither processes the first multicast packet, nor sends the first multicast packet to the second network node. If the first network node is a termination network node connected to the second network node in the clockwise direction, after step S220, the first network node neither processes the second multicast packet, nor sends the second multicast packet to the second network node.

The following uses a specific embodiment to describe the multicast packet transmission method in the embodiments of this application. The method may be applied to a multicast ring network. The multicast ring network includes R network nodes connected sequentially, the R network nodes include a second network node, at least one first network node, at least one intermediate network node, a third network node, and a fourth network node. The second network node is connected to a multicast source device, each of the at least one first network node is connected to one or more multicast destination devices, each first network node stores a sequence number of a received multicast packet, a traffic flow direction of the multicast ring network includes a clockwise direction and an anticlockwise direction opposite to the clockwise direction, a network node connected to the second network node in the clockwise direction is the fourth network node, and a network node connected to the second network node in the anticlockwise direction is the third network node. The method includes the following steps.

Step 1: The second network node receives a multicast traffic flow sent by the multicast source device, where the multicast traffic flow includes at least one multicast packet.

Step 2: If the multicast traffic flow is an IP service or an MPLS service, the second network node may add a sequence number to a multicast packet that needs to be sent in the multicast traffic flow, and then perform processing, to obtain two multicast packets with a same payload, for example, the foregoing first multicast packet and the foregoing second multicast packet. Alternatively, the second network node may process a multicast packet that needs to be sent in the multicast traffic flow, and then add a same sequence number to the two processed multicast packets to obtain two same multicast packets. The two same multicast packets are separately sent, through a label forwarding path, to the network node connected to the second network node in the clockwise direction and the network node connected to the second network node in the anticlockwise direction. The two same multicast packets are respectively encapsulated into two packets, for example, an LSP label is added after a virtual private network (VPN) service label is encapsulated. It should be understood that the two packets may be simultaneously sent, or may not be simultaneously sent. This is not limited in this embodiment of this application.

Optionally, if the multicast traffic flow is an IP service or an MPLS service, an Ethernet header may be first added to the IP service or the MPLS service, then an operation such as processing or adding a sequence number is performed to obtain the two multicast packets with the same payload. The two same multicast packets are sent, through PW, to the network node connected to the second network node in the clockwise direction and the network node connected to the second network node in the anticlockwise direction. Optionally, if the multicast traffic flow is an Ethernet service, operations such as processing and the adding the sequence number may be performed on the Ethernet service, to obtain the two multicast packets with the same payload. The two same multicast packets are separately sent, through PW, to the network node connected to the second network node in the clockwise direction and the network node connected to the second network node in the anticlockwise direction. The two same multicast packets are respectively encapsulated into two packets, for example, the encapsulation may be adding a PW label and an LSP label.

Optionally, before the two same multicast packets are sent, the method further includes that the second network node needs to respectively add path labels or service labels to the two multicast packets. Further, the second network node adds a same path label or service label to the multicast packets in the multicast traffic flow sent in the clockwise direction, and the second network node adds a same path label or service label to the multicast packets in the multicast traffic flow sent in the anticlockwise direction.

Figure 7:
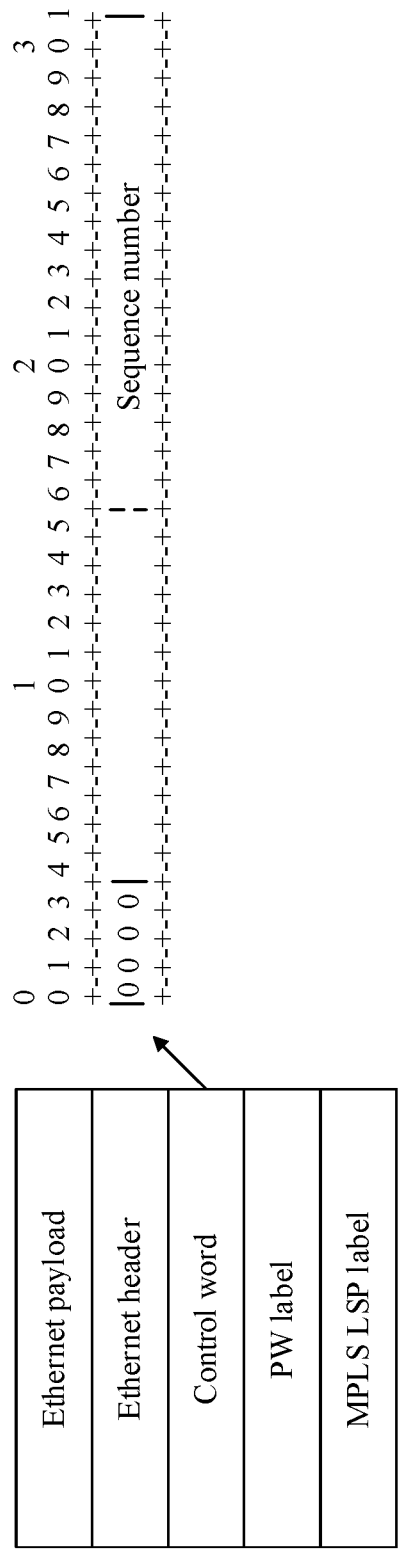
FIG. 7 is a schematic diagram of a multicast packet carrying a control word according to an embodiment of this application.
Figure 8:
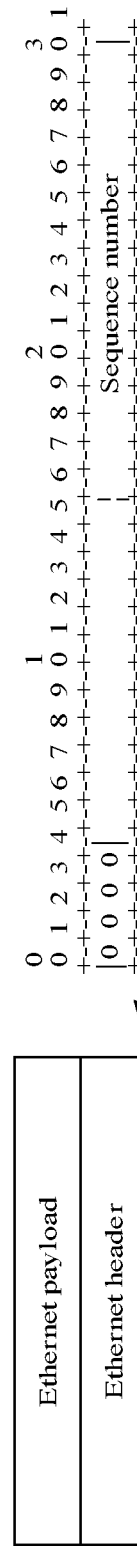
FIG. 8 is a schematic diagram of a multicast packet carrying a control word according to an embodiment of this application.

Optionally, after the second network node processes the multicast packets, the second network node may add a control word carrying the sequence number to any Ethernet frame in order to obtain a multicast packet carrying the control word. For a complete PW encapsulation format of the multicast packet carrying the control word, refer to FIG. 7 or FIG. 8. As shown in FIG. 7 or FIG. 8, an Ethernet payload is a payload included in the Ethernet frame. The Ethernet header is a header included in the Ethernet frame. The control word may be used to carry the sequence number, that is, the sequence number may be placed at last 16 bits or last 28 bits in the PW control word during encapsulation. The last 28 bits in the control word are used to carry the sequence number such that at a same data packet sending rate, a time required for restoring to a start value after the sequence number reaches a maximum value is prolonged. This helps avoid a case in which different multicast packets carry the same sequence number.

For example, the second network node sequentially processes the multicast packets carrying the sequence number, to obtain the two multicast packets with the same payload. The sequential processing is to process the packets one by one in an order of receiving, by the second network node, the multicast packets sent by the multicast source device (for example, a new Ethernet frame carrying the sequence number).

Figure 9:
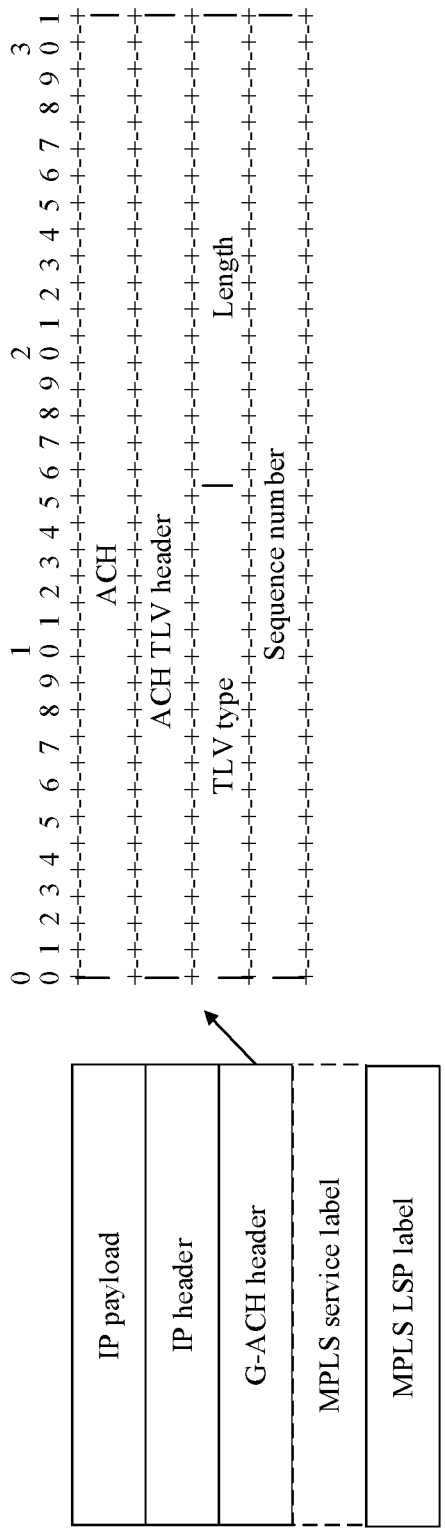
FIG. 9 is a schematic diagram of a multicast packet carrying a control word according to an embodiment of this application.

Optionally, the second network node may further encapsulate an MPLS header at an outer layer of the multicast packet included in the multicast traffic flow. A label in the MPLS header may be an MPLS LSP label and a PW label (as shown in FIG. 7), or a label in the MPLS header is only a PW label (as shown in FIG. 8). Description is not provided using an example in this embodiment of this application. For example, the service label may be a PW label. For another example, the path label may be an MPLS LSP label. As shown in FIG. 9, the second network node may encapsulate a G-ACH header at the outer layer of the IP multicast packet included in the multicast traffic flow, where a type-length-value (TLV) carried in the G-ACH header includes the sequence number. Optionally, a layer of MPLS service label may be further encapsulated onto the G-ACH header. For example, the service label may be an L3VPN service label. At an outermost layer, the path label, namely, the MPLS LSP label, may be encapsulated.

For example, the second network node may obtain the sequence number in the following two manners. In one manner, the Ethernet frame received by the second network node from the multicast source device is a new Ethernet frame of an IEEE802.1CB type, where the Ethernet frame carries the sequence number, and the second network node uses the sequence number read from the Ethernet frame as the sequence number of the multicast packet to which the Ethernet frame belongs. In this way, after the second network node performs processing, multicast packets with the same payload carry same Ethernet frames, and the same Ethernet frames carry same sequence numbers. In the other manner, the second network node may perform calculation based on the multicast packets in the Ethernet frame using a local algorithm, to generate the sequence number. The local algorithm may be a Hash algorithm.

Step 3: The second network node sends one of the two same multicast packets to the fourth network node in the clockwise direction, and sends the other multicast packet to the third network node in the anticlockwise direction.

Step 4: The third network node connected to the second network node receives the second multicast packet sent by the second network node in the anticlockwise direction, and the fourth network node connected to the second network node receives the first multicast packet sent by the second network node in the clockwise direction.

Step 5: If the third network node is connected to a multicast destination device, the third network node may be referred to as the first network node, or if the fourth network node is connected to a multicast destination device, the fourth network node may be referred to as the first network node. If the third network node is not connected to a multicast destination device, the third network node continues to send the second multicast packet to a network node connected to the third network node in the anticlockwise direction, or if the fourth network node is not connected to a multicast destination device, the fourth network node continues to send the second multicast packet to a network node connected to the fourth network node in the clockwise direction.

Step 6: The first network node determines, based on the path label or the service label, whether to perform service processing on the received multicast packets. When the first network node is a network node connected to a multicast destination device, and the first network node first receives the first multicast packet, but does not receive the second multicast packet, the first network node sends, in a multicast manner, the first multicast packet to the at least one multicast destination device connected to the first network node. That is, the first network node sends the first multicast packet, and each of the at least one multicast destination device can receive the first multicast packet. When the first network node does not receive the second multicast packet, a fault or a packet loss may occur on a link in the anticlockwise direction between the second network node and the first network node. When the first network node is a network node connected to a multicast destination device, and the first network node receives the second multicast packet, but does not receive the first multicast packet, the first network node sends, in a multicast manner, the second multicast packet to the at least one multicast destination device connected to the first network node. That is, the first network node sends the second multicast packet, and each of the at least one multicast destination device can receive the second multicast packet. When the first network node does not receive the first multicast packet, a fault or a packet loss may occur on a link in the clockwise direction between the second network node and the first network node.

Optionally, when the first network node receives both the first multicast packet and the second multicast packet, after the first network node removes the MPLS encapsulation (which may include the Ethernet PW encapsulation), the first network node may determine, based on the sequence number carried in the first multicast packet, whether the first multicast packet and the second multicast packet include same payloads. To be specific, the first network node sends, in the multicast manner, the first received multicast packet to the at least one multicast destination device connected to the first network node, and discards the later received multicast packet, to be specific, the first network node does not send, in the multicast manner, the later received multicast packet to the at least one multicast destination device. Alternatively, when the first network node receives both the first multicast packet and the second multicast packet, the first network node selects one multicast packet to send, in the multicast manner, to the at least one multicast destination device, and discards the remaining multicast packet. It should be understood that the first multicast packet and the second multicast packet may or may not be received simultaneously. This is not limited in this embodiment of this application.

When the multicast packet is the Ethernet service, the first network node enters Ethernet multicast processing in order to perform Ethernet layer multicast. If the multicast packet is the IP service or the MPLS service, the first network node may further decapsulate the Ethernet header of the multicast packet, and then enter IP multicast processing in order to perform IP or MPLS multicast.

Step 7: If the first network node receives the first multicast packet, the first network node processes the first multicast packet, and continues to send a third multicast packet obtained after the processing to the network node (which may be the first network node or the intermediate network node) connected to the first network node in the clockwise direction. If the first network node receives the second multicast packet, the first network node processes the second multicast packet, and continues to send a fourth multicast packet obtained after the processing to the network node (which may be the first network node or the intermediate network node) connected to the first network node in the anticlockwise direction.

Step 8: When the third network node receives the first multicast packet, if the third network node is connected to a multicast destination device, the third network node may be referred to as the first network node. Different from the first network node, the third network node neither processes the first multicast packet nor continues to send to the second network node. If the third network node is not connected to a multicast destination device, the third network node discards the first multicast packet, that is, the third network node does not continue to send the first multicast packet to the second network node. This can avoid a service loopback in the network. Optionally, when the fourth network node receives the second multicast packet, if the fourth network node is connected to a multicast destination device, the fourth network node may be referred to as the first network node. Different from the first network node, the fourth network node neither processes the second multicast packet, nor continues to send to the second network node. If the fourth network node is not connected to a multicast destination device, the fourth network node discards the second multicast packet. To be specific, the fourth network node does not continue to send the second multicast packet to the second network node. This can avoid a service loopback in the network.

The foregoing describes in detail the multicast packet transmission method according to the embodiments of this application with reference to FIG. 2 to FIG. 9. The following describes a multicast packet transmission apparatus and system according to embodiments of this application with reference to FIG. 10 to FIG. 14.

Figure 10:
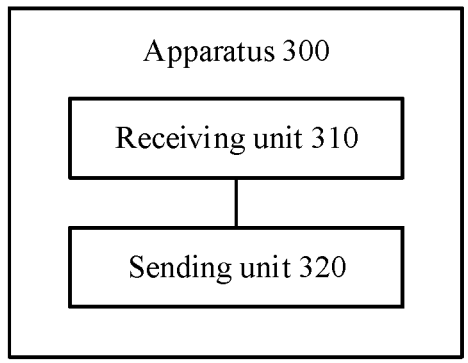
FIG. 10 is a schematic diagram of a multicast packet transmission apparatus according to an embodiment of this application.

FIG. 10 is a schematic block diagram of a multicast packet transmission apparatus 300 according to an embodiment of this application. The apparatus 300 may be the first network node in the method 200. A multicast ring network includes the apparatus 300. As shown in FIG. 10, the apparatus 300 includes a receiving unit 310 and a sending unit 320.

The receiving unit 310 is configured to receive, through a first path in a clockwise direction of the multicast ring network, a first multicast packet sent by a second network node in the multicast ring network.

The receiving unit 310 is further configured to receive, through a second path in an anticlockwise direction of the multicast ring network, a second multicast packet sent by the second network node, where a payload of the first multicast packet is the same as a payload of the second multicast packet.

The sending unit 320 is configured to forward the first multicast packet or the second multicast packet to at least one multicast destination device connected to the apparatus.

In an optional embodiment, the apparatus 300 further includes a first processing unit (not shown) configured to process, after the first multicast packet sent by the second network node in the multicast ring network is received through the first path in the clockwise direction of the multicast ring network, the first multicast packet to obtain a third multicast packet, where the payload of the first multicast packet is the same as a payload of the third multicast packet, and the sending unit 320 is further configured to send the third multicast packet through the first path in the clockwise direction.

In an optional embodiment, the apparatus 300 further includes a second processing unit (not shown) configured to process, after the second multicast packet sent by the second network node is received through the second path in the anticlockwise direction of the multicast ring network, the second multicast packet to obtain a fourth multicast packet, where the payload of the second multicast packet is the same as a payload of the fourth multicast packet, and the sending unit 320 is further configured to send the fourth multicast packet through the second path in the anticlockwise direction.

In an optional embodiment, the first multicast packet and the second multicast packet each include a sequence number, where the sequence number is a sequence of the first multicast packet and the second multicast packet in a multicast traffic flow. The sending unit 320 is configured to forward, based on the sequence number, the first multicast packet or the second multicast packet to the at least one multicast destination device connected to the apparatus 300.

In an optional embodiment, first identifiers are respectively added to the first multicast packet and the second multicast packet. The first identifier is a path label or a service label, or the first identifier is a combination of a path label and a service label. The apparatus 300 further includes a determining unit (not shown) configured to, before the first multicast packet or the second multicast packet is forwarded to the at least one multicast destination device connected to the apparatus 300, determine, based on the first identifiers, that the first multicast packet and the second multicast packet need to be forwarded to the at least one multicast destination device connected to the apparatus 300.

In an optional embodiment, the first identifier of the first multicast packet is a first service label, and the first identifier of the second multicast packet is a second service label. The determining unit is configured to determine, based on the first service label, that the first multicast packet needs to be forwarded to the at least one multicast destination device connected to the apparatus 300, and determine, based on the second service label, that the second multicast packet needs to be forwarded to the at least one multicast destination device connected to the apparatus 300.

In an optional embodiment, the first path and the second path are label forwarding paths or PW.

In an optional embodiment, the sending unit 320 is configured to forward, in an Ethernet multicast mode or an IP multicast mode, the first multicast packet or the second multicast packet to the at least one multicast destination device connected to the apparatus 300.

It should be understood that, the apparatus 300 herein is presented in a form of functional unit. The term "unit" herein may be an application specific integrated circuit (ASIC), an electronic circuit, a processor configured to execute one or more software or firmware programs (for example, a shared processor, a dedicated processor, or a group processor), a memory, a merged logic circuit, and/or another suitable component that supports the described function. In an optional example, a person skilled in the art may understand that the apparatus 300 may be the first network node in the foregoing embodiments, and that the apparatus 300 may be configured to perform procedures and/or steps corresponding to the first network node in the foregoing method embodiments. To avoid repetition, details are not described herein again.

Figure 11:
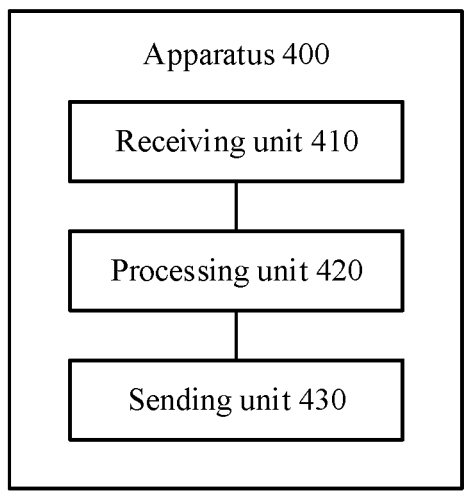
FIG. 11 is a schematic diagram of another multicast packet transmission apparatus according to an embodiment of this application.

FIG. 11 is a schematic block diagram of a multicast packet transmission apparatus 400 according to an embodiment of this application. The apparatus 400 may be the second network node in the method 100. A multicast ring network includes the apparatus 400. As shown in FIG. 11, the apparatus 400 includes a receiving unit 410, a processing unit 420, and a sending unit 430.

The receiving unit 410 is configured to receive a multicast traffic flow sent by a multicast source device, where the multicast traffic flow includes at least one multicast packet.

The processing unit 420 processes a multicast packet in the at least one multicast packet to obtain a first multicast packet and a second multicast packet, where a payload of the first multicast packet is the same as a payload of the second multicast packet.

The sending unit 430 is configured to send the first multicast packet through a first path in a clockwise direction of the multicast ring network.

The sending unit 430 is further configured to send, by the second network node, the second multicast packet through a second path in an anticlockwise direction of the multicast ring network.

It should be understood that, the apparatus 400 herein is presented in a form of functional unit. The term "unit" herein may be an ASIC, an electronic circuit, a processor configured to execute one or more software or firmware programs (for example, a shared processor, a dedicated processor, or a group processor), a memory, a merged logic circuit, and/or another suitable component that supports the described function. In an optional example, a person skilled in the art may understand that the apparatus 400 may be the second network node in the foregoing embodiments, and that the apparatus 400 may be configured to perform procedures and/or steps corresponding to the second network node in the foregoing method embodiments. To avoid repetition, details are not described herein again.

Figure 12:
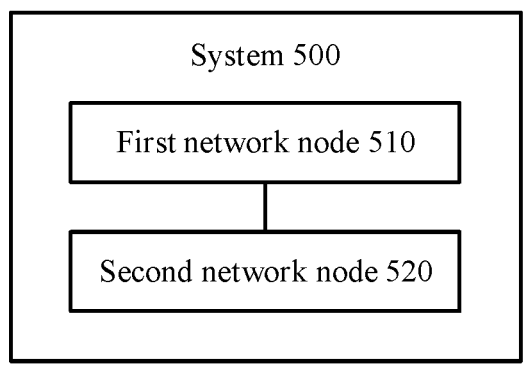
FIG. 12 is a schematic diagram of a multicast packet transmission system according to an embodiment of this application.

FIG. 12 is a schematic diagram of a multicast packet transmission system 500 according to an embodiment of this application. The system 500 is applied to a multicast ring network and includes a first network node 510 and a second network node 520, where the first network node 510 may be the first network node in the foregoing method 200, and the second network node 520 may be the second network node in the method 100.

The second network node 520 is configured to receive a multicast traffic flow sent by a multicast source device, where the multicast traffic flow includes at least one multicast packet, process a multicast packet in the at least one multicast packet to obtain a first multicast packet and a second multicast packet, send the first multicast packet through a first path in a clockwise direction of the multicast ring network, and send the second multicast packet through a second path in an anticlockwise direction of the multicast ring network.

The first network node 510 is configured to receive, through the first path in the clockwise direction, the first multicast packet sent by the second network node, and/or receive, through the second path in the anticlockwise direction, the first multicast packet sent by the second network node, and forward the first multicast packet or the second multicast packet to at least one multicast destination device connected to the first network node.

In an optional embodiment, the second network node 520 is configured to, after the multicast packet in the at least one multicast packet is processed to obtain a first multicast packet and a second multicast packet, add a same sequence number to the first multicast packet and the second multicast packet. The sequence number is a sequence of the first multicast packet and the second multicast packet in the multicast traffic flow.

The first network node 510 is configured to receive, through the first path in the clockwise direction, the first multicast packet sent by the second network node, receive, through the second path in the anticlockwise direction, the first multicast packet sent by the second network node, and forward, based on the sequence number, the first multicast packet or the second multicast packet to the at least one multicast destination device connected to the first network node.

The first network node 510 is configured to forward, based on the second identifier, a first received multicast packet in the first multicast packet and the second multicast packet to the at least one multicast destination device.

In an optional embodiment, the second network node 520 is further configured to add a first identifier to the at least one multicast packet, where the first identifier is a path label or a service label, or the first identifier is a combination of a path label and a service label, and the first network node 510 is further configured to before forwarding the first multicast packet or the second multicast packet to the at least one multicast destination device connected to the first network node, determine, based on the first identifier, that the first multicast packet and/or the second multicast packet need/needs to be forwarded to the at least one multicast destination device connected to the first network node.

In an optional embodiment, the system 500 further includes a third network node (not shown), where the third network node is a network node connected to the second network node in an anticlockwise direction, and the third network node is configured to receive the first multicast packet through the first path in the clockwise direction, and the third network node is further configured to discard the first multicast packet.

In an optional embodiment, the system 500 further includes a fourth network node (not shown), where the fourth network node is a network node connected to the second network node in a clockwise direction, and the fourth network node is configured to receive the second multicast packet through the second path in the anticlockwise direction, and the fourth network node is further configured to discard the second multicast packet.

The foregoing apparatus 300 or the apparatus 400 corresponds to the first network node or the second network node in the method embodiments, and corresponding units perform corresponding steps. For example, the sending unit performs the sending steps in the method embodiments, the receiving unit performs the receiving steps in the method embodiments, and the processing unit may perform other steps than the sending and receiving steps. For a function of a specific unit, refer to a corresponding method embodiment. Details are not described herein.

The first network node and the second network node in the foregoing solutions have functions of implementing corresponding steps performed by the first network node and the second network node in the foregoing methods. The functions may be implemented by hardware, or may be implemented by hardware by executing corresponding software. The hardware or the software includes one or more units corresponding to the foregoing functions. For example, the sending unit may be replaced by a transmitter, the receiving unit may be replaced by a receiver, and other modules such as the processing unit may be replaced by a processor, to respectively perform the sending operation, the receiving operation, and the related processing operation in each method embodiment.

Figure 13:
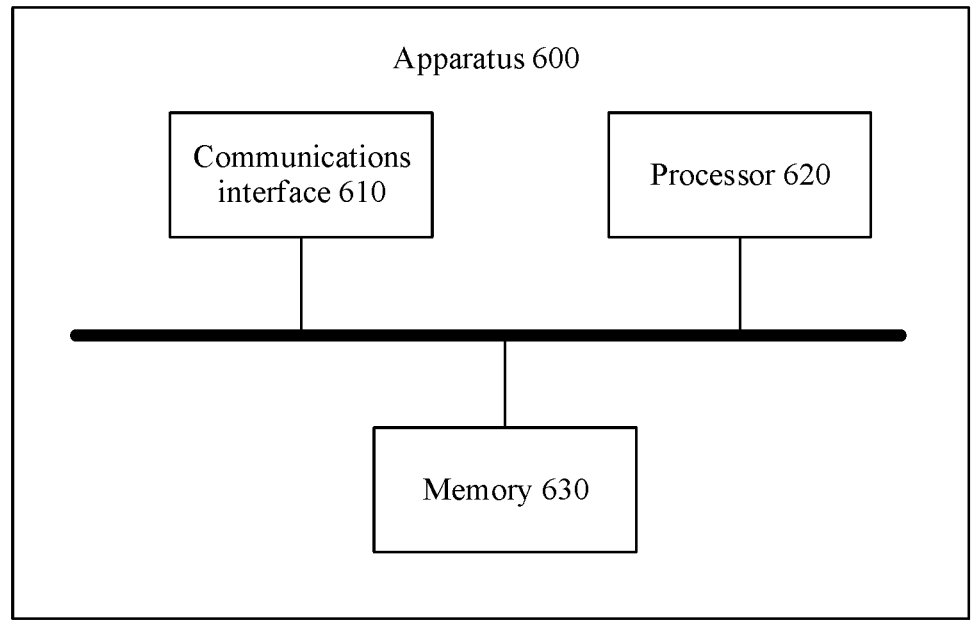
FIG. 13 is a schematic diagram of a multicast packet transmission apparatus according to an embodiment of this application.

FIG. 13 is a schematic block diagram of an information transmission apparatus 600 according to an embodiment of this application. For example, this apparatus 600 may be the first network node in the method 200. As shown in FIG. 13, the apparatus 600 includes a communications interface 610, a processor 620, and a memory 630. The memory 630 is configured to store an instruction, and the processor 620 is configured to perform the instruction stored in the memory 630, to control the communications interface 610 to receive or send a signal.

The communications interface 610 is configured to receive, through a first path in a clockwise direction of the multicast ring network, a first multicast packet sent by a second network node in the multicast ring network. The communications interface 610 is further configured to receive, through a second path in an anticlockwise direction of the multicast ring network, a second multicast packet sent by the second network node, where a payload of the first multicast packet is the same as a payload of the second multicast packet. The communications interface 610 is further configured to forward the first multicast packet or the second multicast packet to at least one multicast destination device connected to the apparatus.

It should be understood that the apparatus 600 may be the first network node in the embodiments related to the method 200, and may be configured to perform steps and/or procedures corresponding to the first network node in the embodiments related to the method 200. Optionally, the memory 630 includes a read-only memory (ROM) and a random access memory (RAM), and provide an instruction and data to the processor 620. A part of the memory 630 may further include a non-volatile RAM (NVRAM). For example, the memory 630 may further store type information of a device. The processor 610 may be configured to perform the instruction stored in the memory 630 such that the apparatus 600 performs the steps and/or procedures in the foregoing embodiments related to the method 200 corresponding to the first network node.

Figure 14:
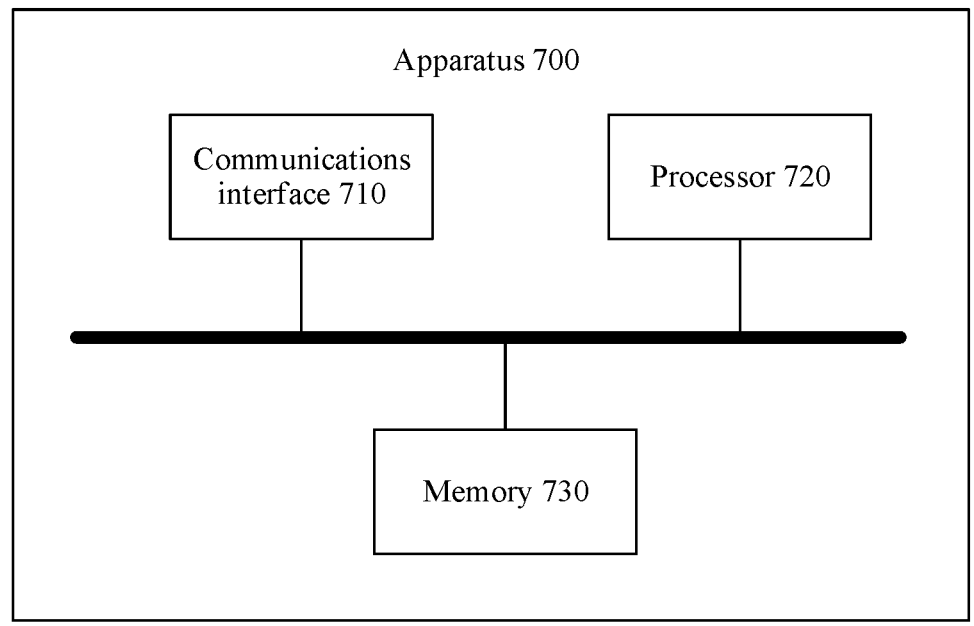
FIG. 14 is a schematic diagram of another multicast packet transmission apparatus according to an embodiment of this application.

FIG. 14 is a schematic block diagram of an information transmission apparatus 700 according to an embodiment of this application. For example, the apparatus may be the second network node in the method 100. As shown in FIG. 14, the apparatus 700 includes a communications interface 710, a processor 720, and a memory 730. The memory 730 is configured to store an instruction, and the processor 720 is configured to perform the instruction stored in the memory 730, to control the communications interface 710 to receive or send a signal.

The communications interface 710 is configured to receive a multicast traffic flow sent by a multicast source device, where the multicast traffic flow includes at least one multicast packet. The processor 720 is configured to process a multicast packet in the at least one multicast packet to obtain a first multicast packet and a second multicast packet, where a payload of the first multicast packet is the same as a payload of the second multicast packet. The communications interface 710 is configured to send the first multicast packet through a first path in a clockwise direction of the multicast ring network. The communications interface 710 is further configured to send the second multicast packet through a second path in an anticlockwise direction of the multicast ring network.

It should be understood that the apparatus 700 may be the second network node in the embodiments related to the method 100, and may be configured to perform steps and/or procedures corresponding to the second network node in the embodiments related to the method 100. Optionally, the memory 730 includes a ROM and a RAM, and provide an instruction and data to the processor 720. A part of the memory 730 may further include an NVRAM. For example, the memory 730 may further store type information of a device. The processor 710 may be configured to perform the instruction stored in the memory 730 such that the apparatus 700 performs the steps and/or procedures in the foregoing embodiments related to the method 100 corresponding to the second network node.

It should be understood that the foregoing communications interface may include a transmitter and a receiver. The communications interface may further include an antenna and there may be one or more antennas. The memory may be a separate device, or may be integrated into the processor. Each of the foregoing devices or some devices may be integrated into a chip for implementation, for example, integrated into a baseband chip for implementation.

It should be understood that in the embodiments of this application, the processor 620 and the processor 720 each may be a central processing unit (CPU). The processor 620 and the processor 720 may alternatively be another general purpose processor, a digital signal processor (DSP), an ASIC, a field programmable gate array (FPGA) or another programmable logic device, a discrete gate or a transistor logic device, a discrete hardware component, or the like. The general purpose processor may be a microprocessor, or the processor may be any conventional processor or the like.

A person of ordinary skill in the art may be aware that, in combination with the examples described in the embodiments disclosed in this specification, the units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A multicast packet transmission method implemented by a first network node in a multicast ring network, comprising:
   receiving, through a first path in a clockwise direction of the multicast ring network, a first multicast packet from a second network node;
   receiving, through a second path in an anticlockwise direction of the multicast ring network, a second multicast packet from the second network node, wherein a first payload of the first multicast packet is the same as a second payload of the second multicast packet, wherein the first multicast packet and the second multicast packet each includes a path label, a service label, or a combination of the path label and the service label, wherein the first multicast packet and the second multicast packet each includes a second identifier, and wherein the second identifier is used to identify that the payload of the first multicast packet is the same as the payload of the second multicast packet; and forwarding only one of the first multicast packet or the second multicast packet to a multicast destination device coupled to the first network node according to the second identifier.

2. The multicast packet transmission method of claim 1, wherein after receiving the first multicast packet, the multicast packet transmission method further comprises:
processing the first multicast packet to obtain a third multicast packet, wherein the first payload is the same as a third payload of the third multicast packet; and
sending the third multicast packet through the first path.

3. The multicast packet transmission method of claim 1, wherein after receiving the second multicast packet, the multicast packet transmission method further comprises:
processing the second multicast packet to obtain a fourth multicast packet, wherein the second payload is the same as a fourth payload of the fourth multicast packet; and
sending the fourth multicast packet through the second path.

4. The multicast packet transmission method of claim 1, wherein the first multicast packet comprises a first sequence number in a multicast traffic flow, wherein the second multicast packet comprises a second sequence number in the multicast traffic flow, and wherein the multicast packet transmission method further comprises forwarding, based on the first sequence number or the second sequence number, only one of the first multicast packet or the second multicast packet to the multicast destination device.

5. The multicast packet transmission method of claim 1, wherein the first multicast packet comprises a first identifier, wherein the second multicast packet comprises a second identifier, wherein each of the first identifier and the second identifier is a path label, and wherein before forwarding only one of the first multicast packet or the second multicast packet, the multicast packet transmission method further comprises determining, based on the first identifier and the second identifier, that only one of the first multicast packet or the second multicast packet needs to be forwarded to the multicast destination device.

6. The multicast packet transmission method of claim 1, further comprising forwarding, in an Ethernet multicast mode, only one of the first multicast packet or the second multicast packet to the multicast destination device.

7. The multicast packet transmission method of claim 1, wherein the first multicast packet comprises a first identifier, wherein the second multicast packet comprises a second identifier, wherein each of the first identifier and the second identifier is a service label, and wherein before forwarding only one of the first multicast packet or the second multicast packet, the multicast packet transmission method further comprises determining, based on the first identifier and the second identifier, that only one of the first multicast packet or the second multicast packet needs to be forwarded to the multicast destination device.

8. The multicast packet transmission method of claim 1, wherein the first multicast packet comprises a first identifier, wherein the second multicast packet comprises a second identifier, wherein each of the first identifier and the second identifier is a combination of a path label and a service label, and wherein before forwarding only one of the first multicast packet or the second multicast packet, the multicast packet transmission method further comprises determining, based on the first identifier and the second identifier, that only one of the first multicast packet or the second multicast packet needs to be forwarded to the multicast destination device.

9. The multicast packet transmission method of claim 1, further comprising forwarding, in an Internet Protocol (IP) multicast mode, only one of the first multicast packet or the second multicast packet to the multicast destination device.

10. A multicast packet transmission apparatus applied to a multicast ring network, wherein the multicast packet transmission apparatus comprises:
a memory configured to store a computer program instruction; and
a processor coupled to the memory, wherein the computer program instruction causes the processor to be configured to:
receive, through a first path in a clockwise direction of the multicast ring network, a first multicast packet from a second network node in the multicast ring network;
receive, through a second path in an anticlockwise direction of the multicast ring network, a second multicast packet from the second network node, wherein a first payload of the first multicast packet is the same as a second payload of the second multicast packet, wherein the first multicast packet and the second multicast packet each includes a path label, a service label, or a combination of the path label and the service label, wherein the first multicast packet and the second multicast packet each includes a second identifier, and wherein the second identifier is used to identify that the payload of the first multicast packet is the same as the payload of the second multicast packet; and
forward only one of the first multicast packet or the second multicast packet to a multicast destination device coupled to the multicast packet transmission apparatus according to the second identifier.

11. The multicast packet transmission apparatus of claim 10, wherein the computer program instruction further causes the processor to be configured to:
process the first multicast packet to obtain a third multicast packet after receiving the first multicast packet, wherein the first payload is the same as a third payload of the third multicast packet; and
send the third multicast packet through the first path.

12. The multicast packet transmission apparatus of claim 10, wherein the computer program instruction further causes the processor to be configured to:
process the second multicast packet to obtain a fourth multicast packet after receiving the second multicast packet, wherein the second payload is the same as a fourth payload of the fourth multicast packet; and
send the fourth multicast packet through the second path.

13. The multicast packet transmission apparatus of claim 10, wherein each of the first multicast packet and the second multicast packet comprise a sequence number, wherein the sequence number is a sequence of the first multicast packet and the second multicast packet in a multicast traffic flow, and wherein the computer program instruction further causes the processor to be configured to forward, based on the sequence number, only one of the first multicast packet or the second multicast packet to the multicast destination device.

14. The multicast packet transmission apparatus of claim 10, wherein the first multicast packet comprises a first identifier, wherein the second multicast packet comprises a second identifier, wherein each of the first identifier or the second identifier is one of a path label, a service label, or a combination of the path label and the service label, and wherein before forwarding the first multicast packet or the second multicast packet, the computer program instruction further causes the processor to be configured to determine, based on the first identifier and the second identifier, that only one of the first multicast packet or the second multicast packet needs to be forwarded to the multicast destination device.

15. The multicast packet transmission apparatus of claim 10, wherein the computer program instruction further causes the processor to be configured to forward, in an Ethernet multicast mode or an Internet Protocol (IP) multicast mode, only one of the first multicast packet or the second multicast packet to the multicast destination device.

16. A multicast packet transmission system applied to a multicast ring network, comprising:
   a second network node configured to:
      receive a multicast traffic flow from a multicast source device, wherein the multicast traffic flow comprises a multicast packet;
      process the multicast packet to obtain a first multicast packet and a second multicast packet, wherein a first payload of the first multicast packet is the same as a second payload of the second multicast packet, wherein the first multicast packet and the second multicast packet each includes a path label, a service label, or a combination of the path label and the service label, wherein the first multicast packet and the second multicast packet each includes a second identifier, and wherein the second identifier is used to identify that the payload of the first multicast packet is the same as the payload of the second multicast packet;
      send the first multicast packet through a first path in a clockwise direction of the multicast ring network; and
      send the second multicast packet through a second path in an anticlockwise direction of the multicast ring network; and
   a first network node configured to:
      receive, through the first path, the first multicast packet from the second network node;
      receive, through the second path, the second multicast packet from the second network node; and
      forward only one of the first multicast packet or the second multicast packet to a multicast destination device coupled to the first network node according to the second identifier.

17. The multicast packet transmission system of claim 16, wherein the second network node is further configured to add a sequence number to the first multicast packet and the second multicast packet after obtaining the first multicast packet and the second multicast packet, wherein the sequence number is a sequence of the first multicast packet and the second multicast packet in the multicast traffic flow, and wherein the first network node is further configured to:
   receive, through the first path, the first multicast packet from the second network node;
   receive, through the second path, the second multicast packet from the second network node; and
   forward, based on the sequence number, the first multicast packet or the second multicast packet to the multicast destination device.

18. The multicast packet transmission system of claim 16, wherein the second network node is further configured to add a first identifier to the multicast packet to obtain the first multicast packet and a second identifier to the multicast packet to obtain the second multicast packet, wherein each of the first identifier and the second identifier is a path label, a service label, or a combination of the path label and the service label, and wherein before forwarding the first multicast packet or the second multicast packet to the multicast destination device, the first network node is further configured to determine, based on the first identifier and the second identifier, that only one of the first multicast packet or the second multicast packet needs to be forwarded to the multicast destination device.

19. The multicast packet transmission system of claim 16, further comprising a third network node coupled to the second network node in the anticlockwise direction, wherein the third network node is configured to:
   receive the first multicast packet through the first path; and
   discard the first multicast packet.

20. The multicast packet transmission system of claim 16, further comprising a fourth network node coupled to the second network node in the clockwise direction, wherein the fourth network node is configured to:
   receive the second multicast packet through the second path; and
   discard the second multicast packet.

* * * * *